United States Patent
Koyama

(10) Patent No.: US 6,623,393 B2
(45) Date of Patent: Sep. 23, 2003

(54) DRIVE BELT FOR CONTINUOUSLY VARIABLE TRANSMISSION

(75) Inventor: Takao Koyama, Atsugi (JP)

(73) Assignee: Nissan Motor Co., Ltd., Yokohama (JP)

(*) Notice: Subject to any disclaimer, the term of this patent is extended or adjusted under 35 U.S.C. 154(b) by 30 days.

(21) Appl. No.: 10/053,682

(22) Filed: Jan. 24, 2002

(65) Prior Publication Data

US 2002/0128104 A1 Sep. 12, 2002

(30) Foreign Application Priority Data

Mar. 12, 2001 (JP) ........................................ 2001-068042

(51) Int. Cl.[7] ................................................. F16G 1/26
(52) U.S. Cl. ........................................ 474/242; 474/201
(58) Field of Search ................................. 474/201, 242, 474/244, 237, 257, 256, 245; 156/137, 140, 304.2, 304.5, 304.6

(56) References Cited

U.S. PATENT DOCUMENTS 5,004,450 A * 4/1991 Ide .............................. 474/242
5,152,047 A * 10/1992 Kojima et al. ................. 29/411
6,090,004 A * 7/2000 Kanehara et al. ............. 474/242

FOREIGN PATENT DOCUMENTS

JP        8-21488 A       1/1996

* cited by examiner

Primary Examiner—Thomas R. Hannon
Assistant Examiner—Vicky A. Johnson
(74) Attorney, Agent, or Firm—Shinjyu Global IP Counselors, LLP.

(57) ABSTRACT

A drive belt for use in a continuously variable transmission has an endless carrier and a plurality of elements. The endless carrier has a plurality of endless metal belts with plank-shaped cross sectional shapes laminated together in both radial and axial directions to form ring aggregates. The ring aggregates reduce the rigidity of the endless carrier in the axial direction and increase the allowable axial deflection endless. Thus, when off-centering occurs, the entire V-belt does not become slanted with respect to a line perpendicular to the rotational axes of the pulleys and the V-shaped blocks can be prevented from becoming tilted with respect to the pulley. As a result, the durability of the pulleys and V-shaped blocks can be improved. The entire V-belt becomes slanted when off-centering occurs in a V-belt continuously variable transmission.

7 Claims, 5 Drawing Sheets

DRIVE BELT FOR CONTINUOUSLY VARIABLE TRANSMISSION

BACKGROUND OF THE INVENTION

1. Field of the Invention

The present invention relates to a drive belt for use in a V-belt continuously variable transmission. More specifically, the present invention relates to a drive belt that is capable of accommodating the off-centering of the pulleys in the axial direction.

2. Background Information

An example of a typical V-belt for a continuously variable transmission is shown in Japanese Laid-Open Patent Publication No. 8-21488. This V-belt continuously variable transmission basically includes an assembled power transmission V-belt that runs between the V-shaped groove of an input pulley and the V-shaped groove of an output pulley. The input pulley is driven so as to rotate about a first axis, while the output pulley rotates about a second axis that is parallel to the first axis. In this arrangement, the rotation of the input pulley is transmitted to the output pulley via the assembled power transmission V-belt. During this transmission, the movable flanges of both pulleys are moved in the axial such that the movable flanges move either closer to or farther away from the stationary flanges. As a result, the arc radius of power transmission V-belt where it wraps around the input and output pulleys varies in a continuous manner such that continuously variable gear changing can be accomplished.

This assembled power transmission V-belt is equipped with a plurality of the V-shaped blocks having slanted end surfaces that frictionally contact the side walls of the V-shaped grooves of the pulleys. These V-shaped blocks are arranged successively in an endless shape so as to form a V-shaped drive belt. The ends of the V-shaped blocks have shoulder parts with a pair of endless bands resting thereon. Each of the endless bands comprises a plurality of endless band elements (rings) layered on top of one another in the radial direction. The assembled power transmission V-belt is utilized as previously described by running the endless arrangement of the V-shaped blocks between the V-shaped grooves of the input and output pulleys.

In view of the above, there exists a need for an improved drive belt. This invention addresses this need in the art as well as other needs, which will become apparent to those skilled in the art from this disclosure.

SUMMARY OF THE INVENTION

It has been discovered that in a V-belt continuously variable transmission, as described in the aforementioned publication, the displacement of the center planes of the V-shaped grooves that occurs during the axial movements of the moveable flanges do not match when moveable flanges are moved in the same axial direction during gear changing control. At some power transmission ratios, the two center planes of the pulleys are aligned. However, at other power transmission ratios, the center planes of the pulleys are offset from each other in the axial direction by a distance α (so-called "off-center" condition). Thus, the V-shaped blocks that rest on input pulley and the V-shaped blocks that rest on output pulley are off-center from each other.

It has further been discovered that a conventional power transmission V-belt has high rigidity in the axial direction and only allows a small amount of axial deflection when off-centering occurs because the endless band is constructed from a plurality of endless band elements layered on top of one another in the radial direction. Consequently, a transverse force acts on the V-belt such that the entire V-belt becomes slanted with respect to a line perpendicular to the rotational axes of the pulleys. Moreover, this transverse force causes the V-shaped blocks becomes tilted with respect to the pulleys, since the V-shape blocks are unable to maintain their parallel orientation with respect to the pulley axes. The durability of the pulleys and the V-shaped blocks should be improved in order to withstand this behavior.

If the endless band were made from an elastic material, the allowable axial deflection would be increased and it would be easier for the V-shaped blocks to maintain their parallel orientation with respect to the pulley axis. However, the rigidity of the belt in the lengthwise direction (circumferential direction) would decline and there would be a higher likelihood of increased vibrations and/or derailing of the V-shaped blocks during rotation.

One object of the present invention is to improve the durability of a power transmission belt by making it easy for the V-shaped blocks to maintain their parallel orientation with respect to the rotational axes of the pulleys and preventing the V-shaped blocks from becoming tilted with respect to the pulleys when the amount of off-centering is large.

In order to achieve this object, a drive belt is provided for use in a continuously variable transmission having a V-shaped pulley with ring aggregates made by laminating a plurality of endless rings in both the radial and axial directions. The drive belt comprises an endless carrier and a plurality of elements. The endless carrier comprises a plurality of first endless metal belts with plank-shaped cross sectional shapes laminated together in both radial and axial directions to form a first ring aggregate. The plurality of elements are supported on the endless carrier and aligned in a peripheral direction of the endless carrier to contact each other. The elements have a pair of tapered side surfaces adapted to move in conjunction with a pulley surface of the V-shaped pulley.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF TABLE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
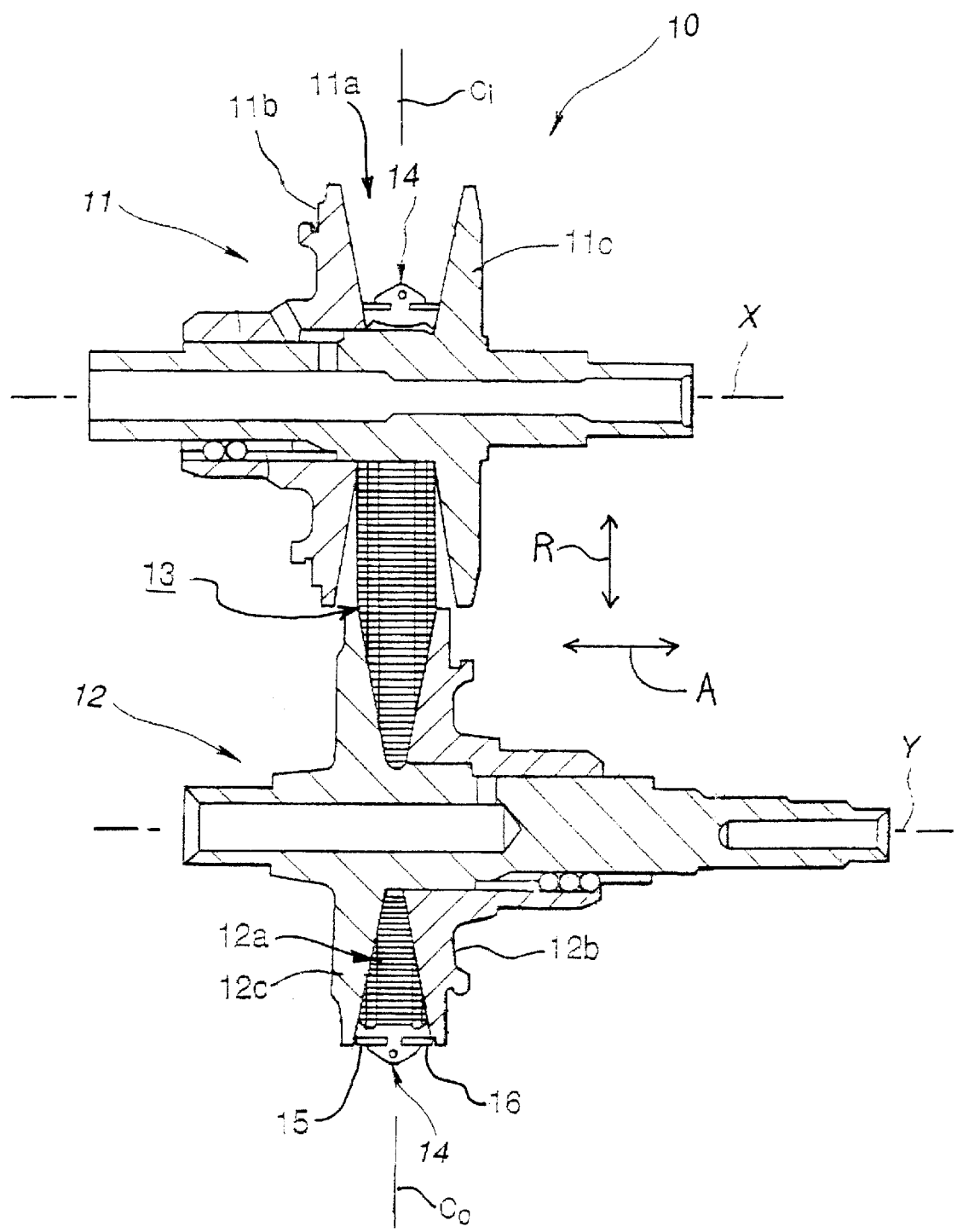
FIG. 1 is a cross sectional view of the main components of a belt driven continuously variable transmission with an assembled drive belt in accordance with a first embodiment of the present invention.
Figure 2:
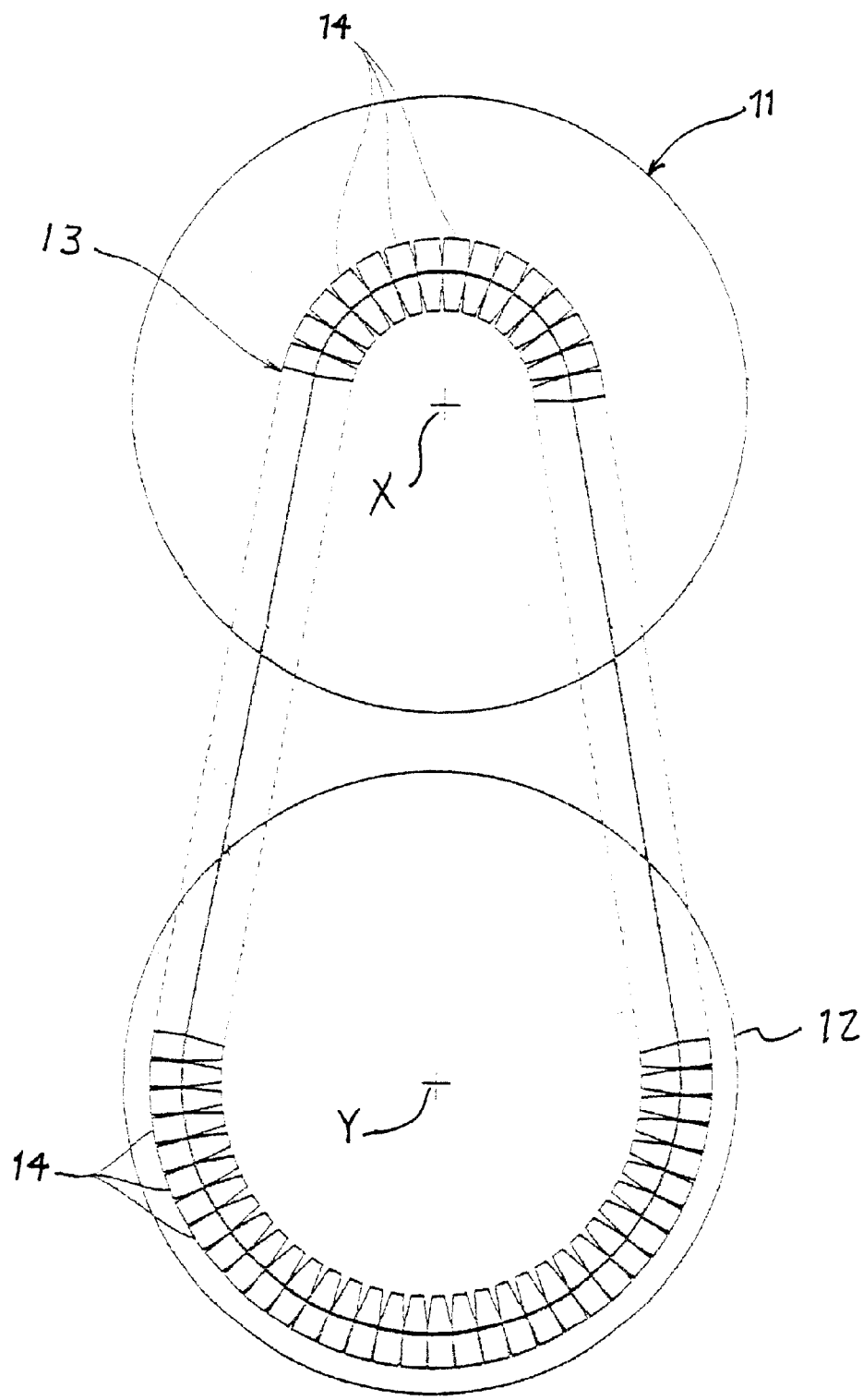
FIG. 2 is a schematic side elevational view the assembled drive belt for use in the belt driven continuously variable illustrated in FIG. 1.
Figure 3:
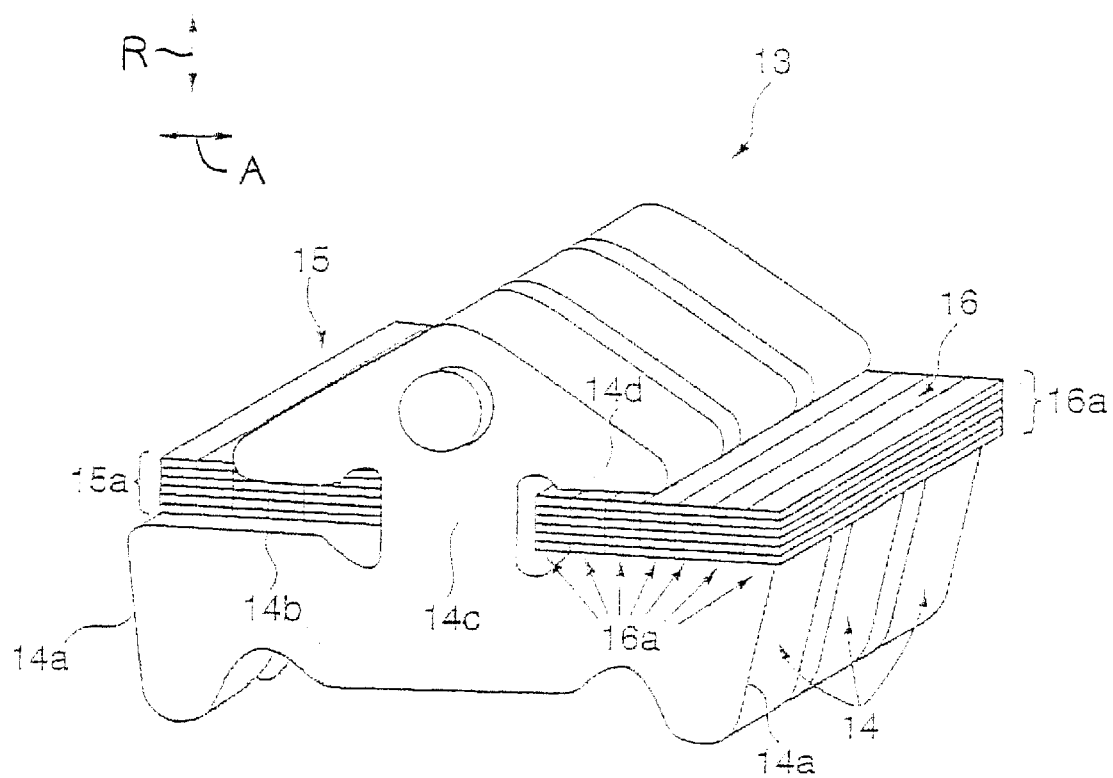
FIG. 3 is an enlarged partial perspective view a portion of the assembled drive belt illustrated in FIGS. 1 and 2 in accordance with the first embodiment of the present invention.

Referring initially to FIGS. 1–3, a belt driven type continuously variable transmission 10 is illustrated, which basically includes an input pulley 11, an output pulley 12 and a drive belt 13 in accordance with a first embodiment of the present invention. The input pulley 11 is driven so as to rotate about a first axis X, while the output pulley 12 rotates about a second axis Y that is parallel to the first axis X. In this drive arrangement, the rotation of the input pulley 11 is transmitted to the output pulley 12 via the drive belt 13. The input pulley 11 has a V-shaped groove 11a defined by a movable flange 11b and a stationary flange 11c. The output pulley 12 has a V-shaped groove 12a defined by a movable flange 12b and a stationary flange 12c. The widths of the V-shaped grooves 11a and 12a are independently varied in an axial direction A in a conventional manner such that continuously variable gear changing can be accomplished. During this transmission, the movable flanges 11b and 12b of the pulleys 11 and 12 are moved in the axial direction A such that the movable flanges 11b and 12b move closer to the stationary flanges 11c and 12c, or farther away from the stationary flanges 11c and 12c, respectively.

The drive belt 13 is preferably a power transmission V-belt that has a plurality of successively arranged V-shaped blocks 14 connected together by a pair of endless bands 15 and 16 to from a continuous loop. In other words, the V-shaped blocks 14 are successively arranged in an endless shape so as to form a V-belt. Each of the V-shaped blocks 14 has a pair of slanted end surfaces 14a that frictionally contact the side walls of the V-shaped grooves 11a and 12a (see FIG. 1) of the pulleys 11 and 12. The endless bands 15 and 16 are provided so as to rest on the respective shoulder parts 14b at both ends of the V-shaped blocks 14. Each V-shaped block 14 is further provided with a pair of arm parts 14d. The arm parts 14d are disposed on a neck part 14c that is located between both of the shoulder parts 14b. The arm parts 14d extend from the neck part 14c in such a manner as to face the shoulder parts 14b. These arm parts 14d prevent the V-shaped blocks 14 from coming off of the endless bands 15 and 16.

In the assembled drive belt 13 of the present invention, the endless bands 15 and 16 are ring aggregates made by laminating a plurality of endless rings 15a and 16a, respectively, in both the radial direction R and the axial direction A. In other words, the endless band 15 is a ring aggregate that is made by laminating together a plurality of the endless band elements 15a (i.e., endless rings) in both the radial direction R and the axial direction A. Likewise, the endless band 16 is a ring aggregate that is made by laminating together a plurality of the endless band elements 16a (i.e., endless rings) in both the radial direction R and the axial direction A.

Since the rigidities of the endless bands 15 and 16 are reduced in the axial direction A by using radially arranged endless rings 15a and 16a, the allowable axial deflection of the drive belt 13 is increased. Thus, using radially arranged endless rings 15a and 16a to form the endless bands 15 and 16 makes it is easier for the V-shaped blocks 14 to maintain their parallel orientation with respect to the axes X and Y Therefore, when off-centering occurs, the entire drive belt 13 does not become slanted with respect to a line perpendicular to the axes X and Y Also the V-shaped blocks 14 are prevented from becoming tilted with respect to the pulleys 11 and 12 by using radially arranged endless rings 15a and 16a to form the endless bands 15 and 16. As a result, the durability of the pulleys 11 and 12 and the V-shaped blocks 14 can be improved.

Also since the rigidity in the lengthwise direction (circumferential direction) can be kept the same as for conventional V-belts, the occurrence of increased vibration and derailing of the V-shaped blocks 14 during rotation can be prevented to the same degree as the prior art.

Figure 4:
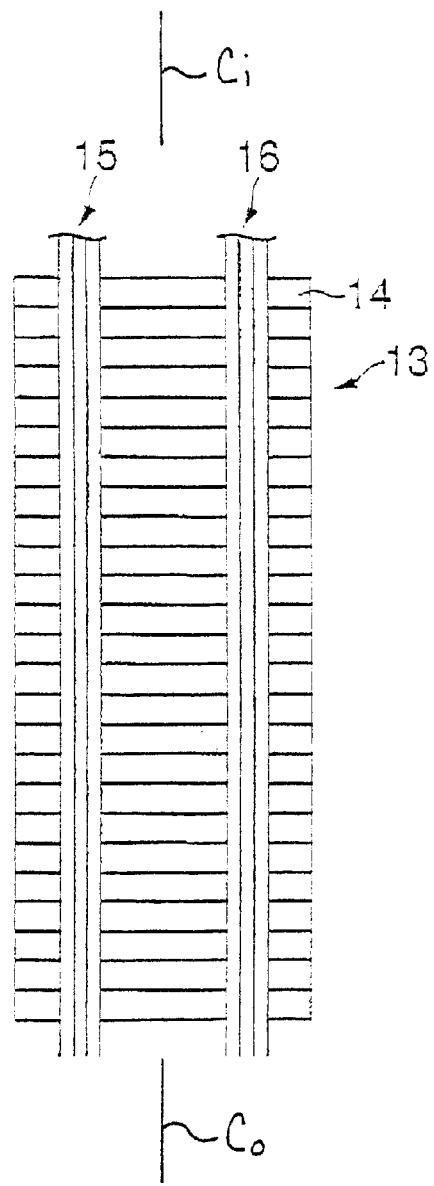
FIG. 4 is a diagrammatic illustration of the assembled drive belt illustrated in FIGS. 1 and 2 showing the operational effect of the present invention in a simple manner when the center plane of the input pulley is aligned with the center plane of the output pulley.
Figure 5:
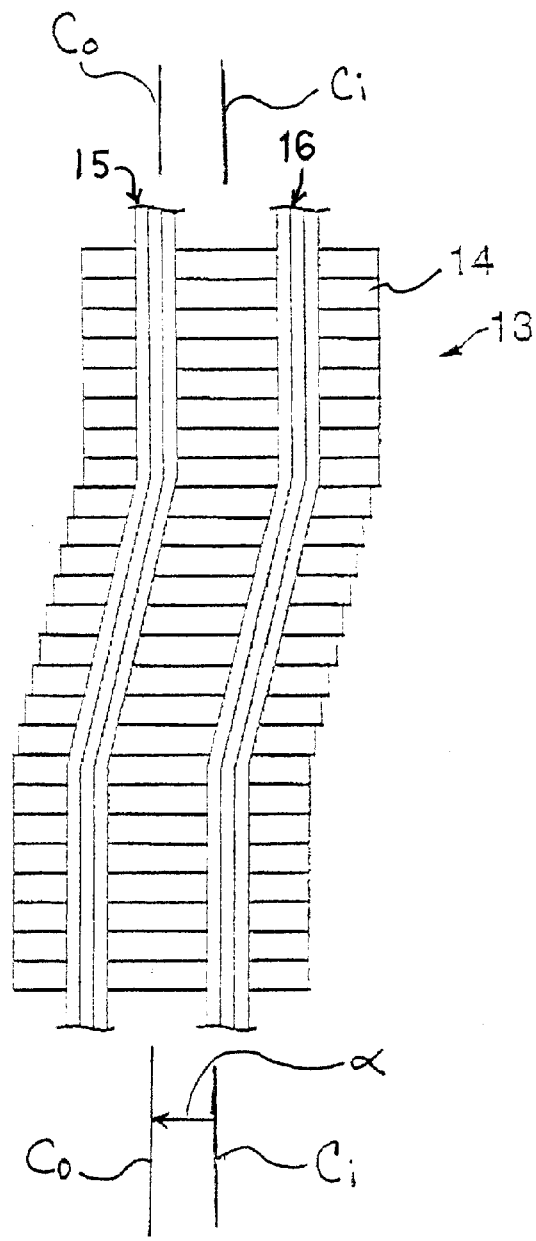
FIG. 5 is a diagrammatic illustration of the assembled drive belt illustrated in FIGS. 1 and 2 showing the operational effect of the present invention in a simple manner when the center plane of the input pulley is offset from the center plane of the output pulley.

The drive belt 13 is utilized by being run between the V-shaped grooves 11a and 12a of the input and output pulleys 11 and 12 in a V-belt continuously variable transmission 10. During gear change control, as previously described, the center planes $C_i$ and $C_o$ of the two pulleys 11 and 12 are aligned at some pulley-to-pulley power transmission ratios and off-center from each other at other pulley-to-pulley power transmission ratios (as described regarding the prior art). In other words, at some power transmission ratios, as seen in FIG. 4, the two center planes $C_i$ and $C_o$ of the pulleys 11 and 12 are aligned. However, at other power transmission ratios, as seen in FIG. 5, the center planes $C_i$ and $C_o$ of the pulleys 11 and 12 are offset from each other in the axial direction A by a distance $\alpha$ (so-called "off-center" condition). Thus, the V-shaped blocks 14 that rest on the V-shaped groove 11a of the input pulley 11 are sometimes off-center from the V-shaped blocks 14 that rest on the V-shaped groove 12a of the output pulley 12, while power is being transmitted.

With the drive belt 13 of this embodiment, the rigidity of the endless bands 15 and 16 in the axial direction A is lower than the rigidity of the endless bands of the prior art because each of the endless bands 15 and 16 is a ring aggregate made by laminating a plurality of endless band elements 15a or 16a together in both the radial and axial directions. Therefore, the allowable axial deflection is larger, and it is easy for each V-shaped block 14 to maintain its parallel orientation with respect to the axes X and Y.

Thus, when the aforementioned off-centering occurs, the entire drive belt 13 does not become slanted with respect to a line perpendicular to the axes X and Y. Moreover, the V-shaped blocks 14 can be prevented from becoming tilted with respect to the pulleys 11 and 12 during such off-centering of the pulleys 11 and 12. Hence, the durability of the pulleys 11 and 12 and the V-shaped blocks 14 can be improved.

Also since the rigidity in the lengthwise direction (circumferential direction) of the drive belt 13 can be held the same as for conventional V-belts, the occurrence of increased vibration and derailing of the V-shaped blocks 14 during rotation can be prevented to the same degree as the prior art.

FIGS. 4 and 5 illustrate in a simple manner how the drive belt 13 of the present invention changes when off-centering occurs. In particular, FIG. 4 shows the condition of the drive belt 13 before off-centering occurs, while FIG. 5 shows the condition of the drive belt 13 after off-centering occurs. As shown in FIG. 5, when off-centering occurs in the drive belt 13 of the present invention, the endless band elements 15a and 16a deflect in the axial direction A relative to the rotational axes X and Y of the pulleys 11 and 12. Thus, there is no slanting of the entire drive belt 13 with respect to a line perpendicular to the rotational axes X and Y of the pulleys 11 and 12.

In the case of a conventional assembled power transmission V-belt, however, the axial rigidity of the endless bands is high and the entire V-belt becomes slanted with respect to a line perpendicular to the rotational axes of the pulleys.

Second Embodiment

Figure 6:
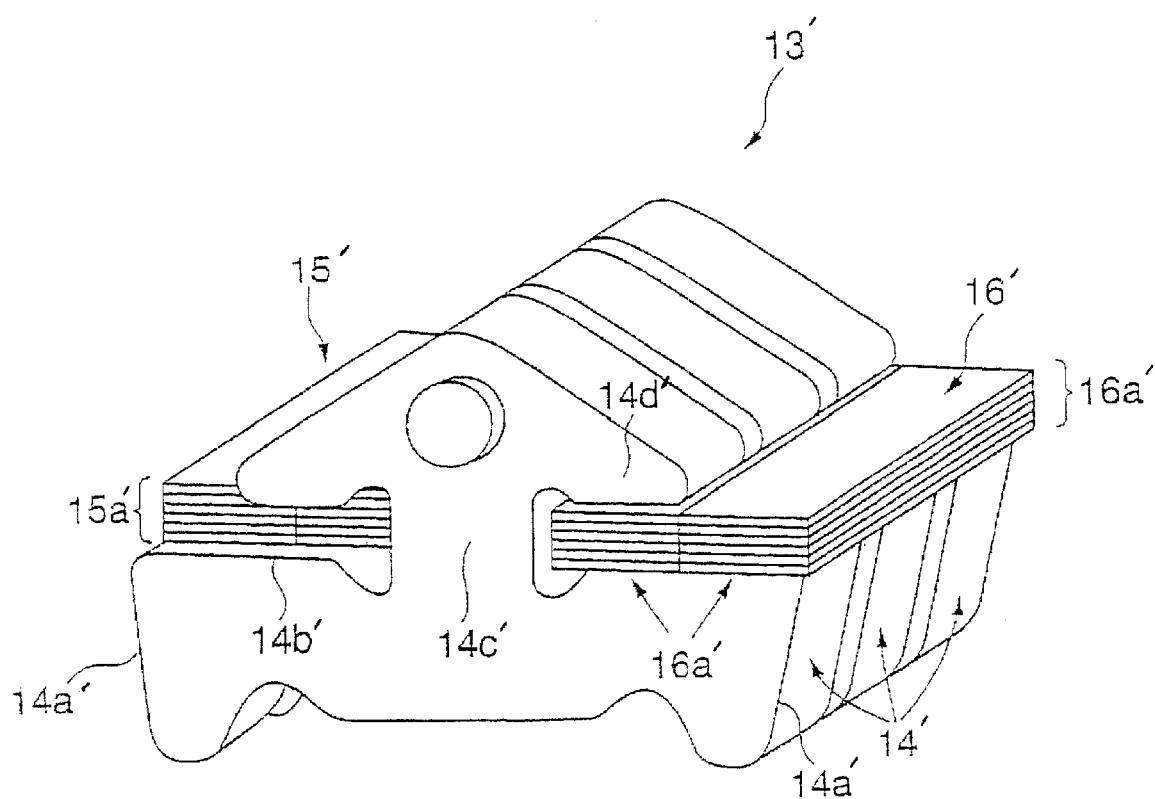
FIG. 6 is a partial perspective view of an assembled drive belt for use in a V-belt continuously variable in accordance with a second embodiment the present invention.

Referring now to FIG. 6, a portion of a drive belt 13' is illustrated in accordance with a second embodiment. In view of the similarity between the first and second embodiments, the descriptions of the parts of the second embodiment that are identical to the parts of the first embodiment may be omitted for the sake of brevity. The parts of the second embodiment that are substantially identical to the parts of the first embodiment will be given the same reference numeral but with a prime (') added thereto.

Similar to the first embodiment, the assembled drive belt 13' is preferably a power transmission V-belt that has a plurality of successively arranged V-shaped blocks 14' connected together by a pair of endless bands 15' and 16' to from a continuous loop. Thus, the V-shaped blocks 14' are successively arranged in an endless shape so as to form a V-belt. Each of the V-shaped blocks 14' has a pair of slanted end surfaces 14a' that frictionally contact the side walls of the V-shaped grooves 11a and 12a (see FIG. 1) of the pulleys 11 and 12. The endless bands 15' and 16' are provided so as to rest on the respective shoulder parts 14b' at both ends of the V-shaped blocks 14'. Each V-shaped block 14' is further provided with a pair of arm parts 14d'. The arm parts 14d' are disposed on a neck part 14c' that is located between both of the shoulder parts 14b'. The arm parts 14d' extend from the neck part 14c' in such a manner as to face the shoulder parts 14b'. These arm parts 14d' prevent the V-shaped blocks 14' from coming off the endless bands 15' and 16'.

The endless bands 15' and 16' are ring aggregates made by laminating a plurality of endless rings 15a' and 16a', respectively, in both the radial direction R and the axial direction A. In this second embodiment, the number of radially arranged endless bands 15' and 16' has been reduced in number as compared to the first embodiment. Accordingly, it will be apparent to those skilled in the art from this disclosure that the number of endless band elements 15a' and 16a' making up each of the endless bands 15' and 16' can be any number so long as the number more than one. It is even acceptable to use a ring aggregate having only two layers in the axial direction as shown in FIG. 6.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-068042. The entire disclosure of Japanese Patent Application No. 2001-068042 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drive belt for use in a continuously variable transmission having a V-shaped pulley, the drive belt comprising:
   an endless carrier comprising a plurality of first endless metal belts with plank-shaped cross sectional shapes laminated together in both radial and axial directions to form a first ring aggregate; and
   a plurality of elements supported on the endless carrier and aligned in a peripheral direction of the endless carrier to contact each other, the elements have a pair of tapered side surfaces adapted to move in conjunction with a pulley surface of the V-shaped pulley.

2. The drive belt according to claim 1, wherein
   each of the elements has a pair of lateral recesses with the first ring aggregate located in one of the lateral recesses, and a second ring aggregate comprising a plurality of second endless metal belts with plank-shaped cross sectional shapes laminated together in both radial and axial directions relative to rotation of the V-shaped pulley.

3. The drive belt according to claim 1, wherein
   the first ring aggregate includes at least six layers of the first endless metal belts arranged in the radial direction relative to rotation of the V-shaped pulley and each of the layers of the first endless metal belts including at least two of the first endless metal belts arranged in the axial direction relative to rotation of the V-shaped pulley.

4. The drive belt according to claim 1, wherein
   each of the layers of the first endless metal belts are substantially equal in thickness and width.

5. The drive belt according to claim 2, wherein
   the first and second ring aggregates include at least six layers of the first and second endless metal belts arranged in the radial direction relative to rotation of the V-shaped pulley and each of the layers of the first and second endless metal belts including at least two of the first and second endless metal belts arranged in the axial direction relative to rotation of the V-shaped pulley.

6. The drive belt according to claim 5, wherein
   each of the layers of the first endless metal belts are substantially equal in thickness and width.

7. A drive belt for use in a continuously variable transmission having a V-shaped pulley, the drive belt comprising:

pulley contacting means for contacting a pulley surface of the V-shaped pulley, the pulley contacting means including a plurality of elements; and endless belt means for coupling and aligning the plurality of elements together to form the drive belt, the endless belt means being configured and arranged relative to the pulley contacting means such that the plurality of elements move individually and parallel in an axial direction relative to one adjacent ones of the plurality of elements.

* * * * *